(12) United States Patent
Paramaguru et al.

(10) Patent No.: US 10,756,951 B2
(45) Date of Patent: Aug. 25, 2020

(54) NETWORK INCIDENT IDENTIFICATION BASED ON CHARACTERIZING RELATIONSHIPS BETWEEN INTERFACES AND EVENTS AS GRAPHICAL COMPONENT RELATIONSHIPS

(71) Applicant: Cisco Technology, Inc., San Jose, CA (US)

(72) Inventors: Parthibhan Paramaguru, Bangalore (IN); Prashant Anand, Bangalore (IN); Vasudevan Visvanathan, Bengaluru (IN); Sundar Ramakrishnan, Bangalore (IN); Dharmarajan Subramanian, Bangalore (IN); Rohit Kumar Gupta, Bangalore (IN); Abhishek Chaudhary, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 272 days.

(21) Appl. No.: 15/662,112

(22) Filed: Jul. 27, 2017

(65) Prior Publication Data

US 2018/0287855 A1   Oct. 4, 2018

Related U.S. Application Data

(60) Provisional application No. 62/479,097, filed on Mar. 30, 2017.

(51) Int. Cl.
*H04L 12/24* (2006.01)

(52) U.S. Cl.
CPC .......... *H04L 41/065* (2013.01); *H04L 41/069* (2013.01); *H04L 41/0883* (2013.01);
(Continued)

(58) Field of Classification Search
CPC . H04L 41/065; H04L 41/069; H04L 41/0883; H04L 41/0677; H04L 41/064; H04L 41/0686
See application file for complete search history.

(56) References Cited

U.S. PATENT DOCUMENTS

| | | | |
|---|---|---|---|
| 6,862,698 B1 * | 3/2005 | Shyu | G06F 11/0709 709/224 |
| 2006/0023638 A1 | 2/2006 | Monaco et al. | |

(Continued)

*Primary Examiner* — Nicholas R Taylor
*Assistant Examiner* — Sanjoy Roy
(74) *Attorney, Agent, or Firm* — Merchant & Gould P.C.

(57) ABSTRACT

Techniques for use in network incident identification are described. In response to an occurrence of an unknown network incident, a plurality of log messages (e.g. syslog messages) are received from a plurality of network components in one or more networks. In one illustrative example, a plurality of relationships between interfaces and events are derived from the received log messages and characterized as a plurality of graphical component relationships. One or more groups of connected components are determined from the graphical component relationships and network component connection data which indicate interface relationships of the network components. Here, groups of connected components may be logically joined based on the network component connection data indicating one or more interface relationships. A network incident may then be identified based on at least one of the determined groups of connected components being associated with at least one identified set of events that has the closest or substantial match with at least one predetermined set of events associated with the network incident.

19 Claims, 14 Drawing Sheets

(52) U.S. Cl.
CPC ........ *H04L 41/064* (2013.01); *H04L 41/0677* (2013.01); *H04L 41/0686* (2013.01)

(56) References Cited

U.S. PATENT DOCUMENTS

| | | | |
|---|---|---|---|
| 2008/0222287 A1* | 9/2008 | Bahl | ........................ H04L 41/12 709/224 |
| 2011/0227925 A1 | 9/2011 | De Pauw et al. | |
| 2014/0172919 A1* | 6/2014 | Johnston | ............... G06F 11/366 707/797 |
| 2014/0219107 A1* | 8/2014 | Racz | ................... H04L 41/0631 370/242 |
| 2014/0245443 A1 | 8/2014 | Chakraborty | |
| 2014/0280900 A1 | 9/2014 | McDowall | |
| 2014/0282027 A1* | 9/2014 | Gao | ........................ H04L 41/22 715/736 |
| 2016/0283310 A1* | 9/2016 | Mankovskii | .......... H04L 41/069 |
| 2017/0272306 A1* | 9/2017 | Venkataraman | ...... H04L 41/065 |

\* cited by examiner

| Router 1 | Link-HostA | Router 2 | Link-HostB |
|---|---|---|---|
| A | HundredGig0/0/0/2 | B | HundredGig0/0/0/4 |
| A | HundredGig0/0/0/7 | C | HundredGig0/0/0/11 |

412

| Interface | IPv4 |
|---|---|
| A:HundredGig0/0/0/2 | A:10.79.0.1 |
| B:HundredGig0/0/0/4 | B:10.79.0.2 |
| A:HundredGig0/0/0/7 | A:10.1.1.5 |
| C:HundredGig0/0/0/11 | C:10.1.1.6 |

414

Network Component Connection Data 410

Figure 4c

Log Messages 420

Syslog from Router A:

RP/0/RP0/CPU0:May 26 05:15:58.881 : ifmgr[145]: %PKT_INFRA-LINK-3-UPDOWN : Interface HundredGigE0/0/0/2, changed state to Down RP/0/RP0/CPU0:May 26 05:15:58.881 : ifmgr[145]: %PKT_INFRA-LINEPROTO-5-UPDOWN : Line protocol on Interface HundredGigE0/0/0/2, changed state to Down RP/0/RP0/CPU0:May 26 05:15:58.881 : ospf[210]: %OSPF-5-ADJCHG: Process 30, Nbr 10.79.0.2 on HundredGigE0/0/0/2 from EXCHANGE to DOWN, Neighbor Down: OSPF IETF NSF helper terminated for neighbor RP/0/RP0/CPU0:May 26 05:15:58.881 : ifmgr[145]: %PKT_INFRA-LINK-3-UPDOWN : Interface HundredGigE0/0/0/7, changed state to Down

Syslog from Router B:

RP/0/RP0/CPU0:May 26 05:15:58.881 : ifmgr[145]: %PKT_INFRA-LINK-3-UPDOWN : Interface HundredGigE0/0/0/2, changed state to Down RP/0/RP0/CPU0:May 26 05:15:58.881 : ifmgr[145]: %PKT_INFRA-LINEPROTO-5-UPDOWN : Line protocol on Interface HundredGigE0/0/0/2, changed state to Down RP/0/RP0/CPU0:May 26 05:15:58.881 : ospf[210]: %OSPF-5-ADJCHG: Process 30, Nbr 10.79.0.1 on HundredGigE0/0/0/2 from EXCHANGE to DOWN, Neighbor Down: OSPF IETF NSF helper terminated for neighbor

Figure 4d

| Vertex1 | Edge | Vertex2 |
|---|---|---|
| A: HundredGigE0/0/0/2 | LINK-DOWN | A: HundredGigE0/0/0/2 |
| A: HundredGigE0/0/0/2 | LINEPROTO-DOWN | A: HundredGigE0/0/0/2 |
| A: HundredGigE0/0/0/2 | OSPF-ADJDOWN | B: 10.79.0.2 |
| B: HundredGigE0/0/0/4 | LINK-DOWN | B: HundredGigE0/0/0/4 |
| B: HundredGigE0/0/0/4 | LINEPROTO-DOWN | B: HundredGigE0/0/0/4 |
| B: HundredGigE0/0/0/4 | OSPF-ADJDOWN | A: 10.79.0.1 |
| A: HundredGigE0/0/0/7 | LINK-DOWN | A: HundredGigE0/0/0/7 |

Interface-Event Relationships 430
Characterized As Graphical Component Relationships

Figure 4e
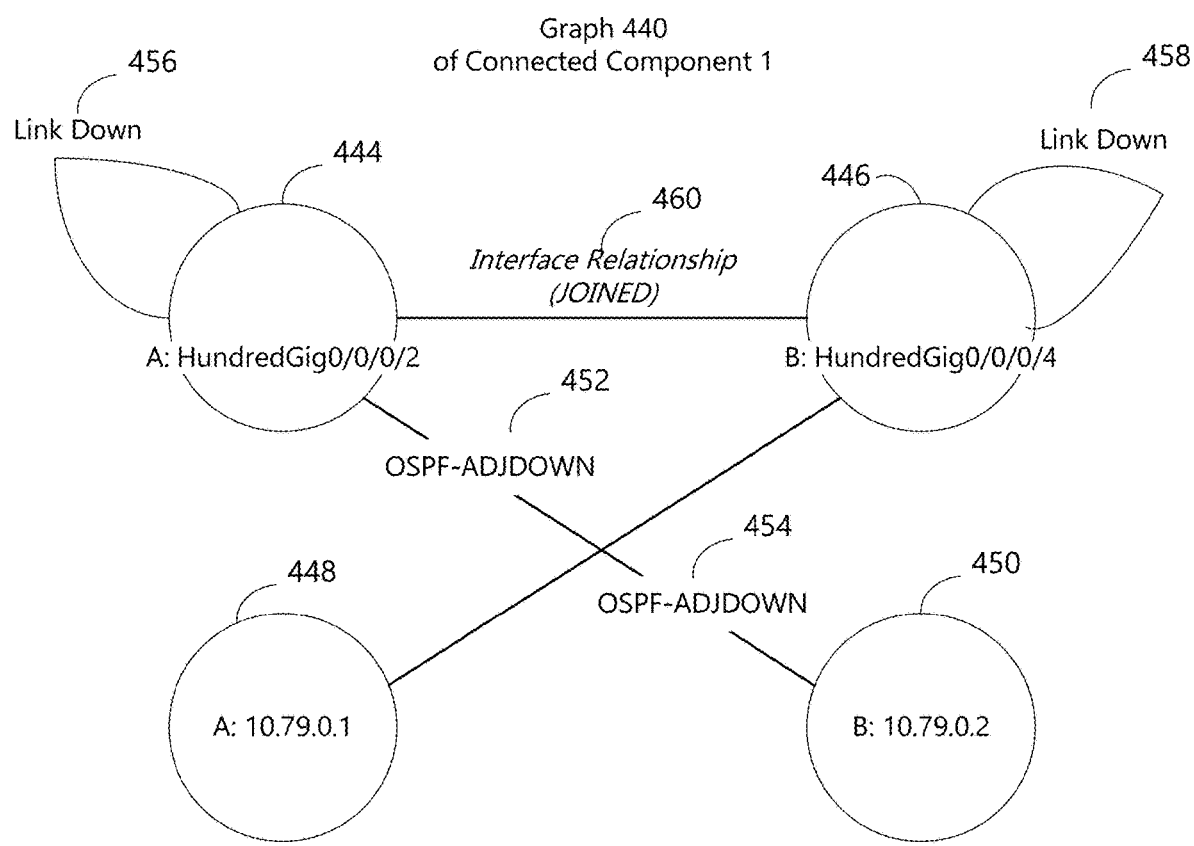
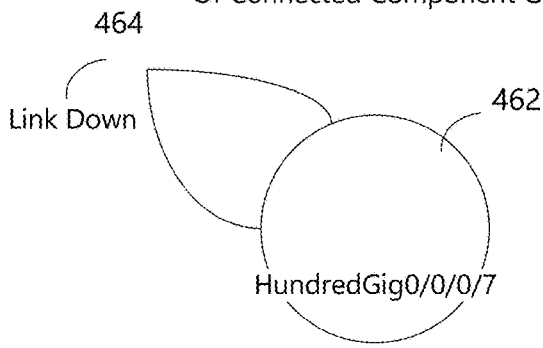

Figure 4f

| Rule# | R1: LINK-DOWN | R1: LINEPROTO-DOWN | R1: BGP DOWN | R1: OSPF-ADJDOWN | R2: LINK-DOWN | R2: LINEPROTO-DOWN | R2: BGP DOWN | R2: OSPF-ADJDOWN | Incident |
|---|---|---|---|---|---|---|---|---|---|
| 1 | 1 | 1 | 0 | 1 | 1 | 1 | 0 | 1 | Ospf down due to link down |
| 2 | 1 | 0 | 0 | 0 | 0 | 0 | 0 | 0 | Link down |

"Rules"

Network Event-Incident Correlation Data --
A Plurality Of Stored Sets of Event Indicator Values 470

Figure 4g

| Connected component | R1: LINK-DOWN | R1: LINEPROTO-DOWN | R1: BGP DOWN | R1: OSPF-ADJDOWN | R2: LINK-DOWN | R2: LINEPROTO-DOWN | R2: BGP DOWN | R2: OSPF-ADJDOWN | |
|---|---|---|---|---|---|---|---|---|---|
| 1 | 1 | 1 | 0 | 1 | 1 | 1 | 0 | 1 | |
| 2 | 1 | 0 | 0 | 0 | 0 | 0 | 0 | 0 | |

A Plurality of Determined Sets of Event Indicator Values 480
Associated With Determined Groups Of Connected Components

Figure 4h

| Connected component | R1: LINK-DOWN | R1: LINEPROTO-DOWN | R1: BGP DOWN | R1: OSPF-ADJDOWN | R2: LINK-DOWN | R2: LINEPROTO-DOWN | R2: BGP DOWN | R2: OSPF-ADJDOWN | |
|---|---|---|---|---|---|---|---|---|---|
| x | 1 | 1 | 0 | 1 | 0 | 0 | 0 | 0 | |

Alternative Determined Set Of Event Indicator Values 490
Associated With A Determined Group Of Connected Components

Figure 4i

| Rule# | LINK-DOWN | LINEPROTO-DOWN | BGP DOWN | OSPF-ADJDOWN | Incident |
|---|---|---|---|---|---|
| 1 | 1 | 1 | 0 | 1 | Ospf down due to link down |
| 2 | 1 | 0 | 0 | 0 | Link down |

"Rules"

Alternative Network Event-Incident Correlation Data --
An Alternative Plurality Of Stored Sets of Event Indicator Values 475

Figure 4j

| Connected component | LINK-DOWN | LINEPROTO-DOWN | BGP DOWN | OSPF-ADJDOWN |
|---|---|---|---|---|
| 1 | 1 | 1 | 0 | 1 |
| 2 | 1 | 0 | 0 | 0 |

Alternative Plurality of Determined Sets of Event Indicator Values 485
Associated With Determined Groups Of Connected Components

Figure 4k

| Meta-Rule # | R1: Rule # | R1: # of Component Groups Matching Rule | Incident |
|---|---|---|---|
| 1 | 2 | 2 | Two links went down on node |
| 2 | 1 | 2 | Two OSPF neighbors went down on node |

| Hostname# | Rule # | # of Component Groups Matching Rule |
|---|---|---|
| Router A | 2 | 2 |
| Router A | 1 | 1 |
| Router B | 2 | 1 |
| Router B | 1 | 1 |

| Router Name | Meta-Rule # | Incident |
|---|---|---|
| Router A | 1 | Two Links Went Down on Node |

498

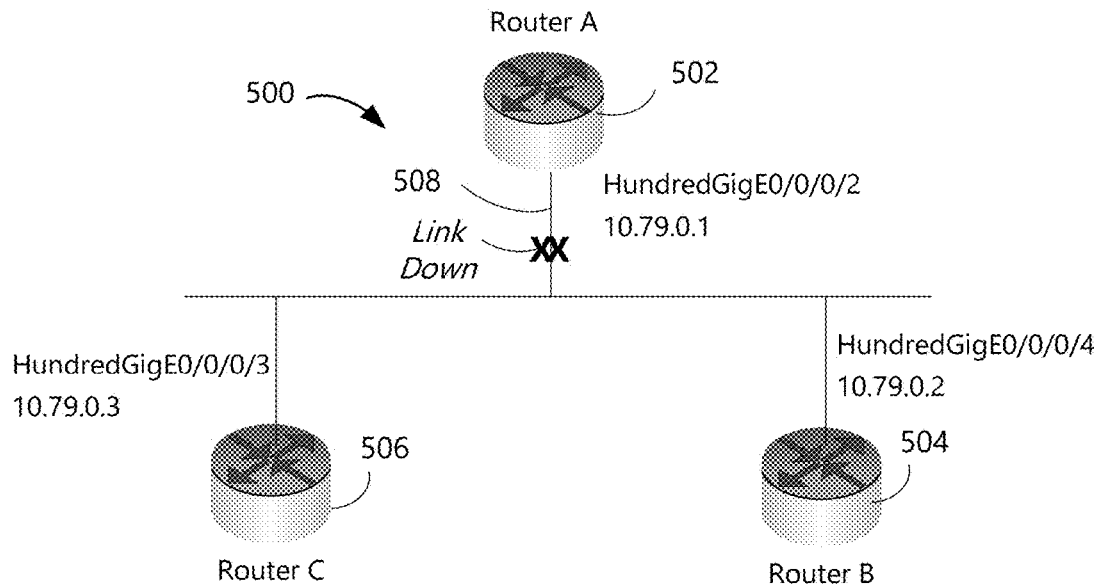

Figure 5c

Log Messages 520

Syslog Generated on Router A:
RP/0/RP0/CPU0:May 26 05:15:58.881 : ifmgr[145]: %PKT_INFRA-LINK-3-UPDOWN : Interface HundredGigE0/0/0/2, changed state to Down RP/0/RP0/CPU0:May 26 05:15:58.881 : ifmgr[145]: %PKT_INFRA-LINEPROTO-5-UPDOWN : Line protocol on Interface HundredGigE0/0/0/2, changed state to Down RP/0/RP0/CPU0:May 26 05:15:58.881 : ospf[210]: %OSPF-5-ADJCHG: Process 30, Nbr 10.79.0.2 on HundredGigE0/0/0/2 from EXCHANGE to DOWN, Neighbor Down: OSPF IETF NSF helper terminated for neighbor RP/0/RP0/CPU0:May 26 05:15:58.881 : ospf[210]: %OSPF-5-ADJCHG: Process 30, Nbr 10.79.0.3 on HundredGigE0/0/0/2 from EXCHANGE to DOWN, Neighbor Down: OSPF IETF NSF helper terminated for neighbor

Syslog Generated on Router B:
RP/0/RP0/CPU0:May 26 05:15:59.881 : ospf[210]: %OSPF-5-ADJCHG: Process 30, Nbr 10.79.0.1 on HundredGigE0/0/0/4 from EXCHANGE to DOWN, Neighbor Down: OSPF IETF NSF helper terminated for neighbor

Syslog Generated on Router C:
RP/0/RP0/CPU0:May 26 05:15:59.881 : ospf[210]: %OSPF-5-ADJCHG: Process 30, Nbr 10.79.0.1 on HundredGigE0/0/0/3 from EXCHANGE to DOWN, Neighbor Down: OSPF IETF NSF helper terminated for neighbor

Figure 5d

| Vertex1 | Edge | Vertex2 |
|---|---|---|
| A: HundredGigE0/0/0/2 | LINK-DOWN | A: HundredGigE0/0/0/2 |
| A: HundredGigE0/0/0/2 | LINEPROTO-DOWN | A: HundredGigE0/0/0/2 |
| A: HundredGigE0/0/0/2 | OSPF-ADJDOWN | B: 10.79.0.2 |
| A: HundredGigE0/0/0/2 | OSPF-ADJDOWN | C: 10.79.0.3 |
| B: HundredGigE0/0/0/4 | OSPF-ADJDOWN | A: 10.79.0.1 |
| C: HundredGigE0/0/0/3 | OSPF-ADJDOWN | A: 10.79.0.1 |

Interface-Event Relationships 530
Characterized As Graphical Component Relationships

Figure 5f

| Rule 2 | R1: LINK-DOWN | R1: LINEPROTO-DOWN | R1: BGP DOWN | R1: OSPF-ADJCHG | R2: LINK-DOWN | R2: LINEPROTO-DOWN | R2: BGP DOWN | R2: OSPF-ADJCHG | |
|---|---|---|---|---|---|---|---|---|---|
| 1 | 1 | 1 | 0 | 1 | 0 | 0 | 0 | 1 | |
| Rule 2 (Continued) | R3: LINK-DOWN | R3: LINEPROTO-DOWN | R3: BGP DOWN | R3: OSPF-ADJCHG | | | | | |
| 1 | 0 | 0 | 0 | 1 | | | | | |

Network Event-Incident Correlation Data --
A Stored Set of Event Indicator Values 580

Incident =

OSPF ADJ DOWN due to link failure on Router 1; Field to inspect link failure

Figure 5g

| Connected component | R1: LINK-DOWN | R1: LINEPROTO-DOWN | R1: BGP DOWN | R1: OSPF-ADJCHG | R2: LINK-DOWN | R2: LINEPROTO-DOWN | R2: BGP DOWN | R2: OSPF-ADJCHG | |
|---|---|---|---|---|---|---|---|---|---|
| 1 | 1 | 1 | 0 | 1 | 0 | 0 | 0 | 1 | |
| Connected component | R3: LINK-DOWN | R3: LINEPROTO-DOWN | R3: BGP DOWN | R3: OSPF-ADJCHG | | | | | |
| 1 | 0 | 0 | 0 | 1 | | | | | |

A Plurality of Determined Sets of Event Indicator Values 590
Associated With Determined Groups Of Connected Components

NETWORK INCIDENT IDENTIFICATION BASED ON CHARACTERIZING RELATIONSHIPS BETWEEN INTERFACES AND EVENTS AS GRAPHICAL COMPONENT RELATIONSHIPS

CROSS-REFERENCE TO RELATED APPLICATION

This application claims the benefit of U.S. Provisional Patent Application No. 62/479,097 filed on Mar. 30, 2017, the contents of which are hereby incorporated by reference for all purposes.

TECHNICAL FIELD

This disclosure relates generally to network incident identification, and more particularly to network incident identification in networks based on characterizing interface-event relationships based on graphical component relationships.

BACKGROUND

Syslog is a protocol for message logging to generate and store log messages locally in a network device, and then forward them for collection, filtering, organization, and analysis. Network administrators may track and monitor such log messages to identify issues or problems in a network. Other types of message logging include streaming telemetry, Simple Network Management Protocol (SNMP), Command Line Interface (CLI) data collection, and network event traps.

As is apparent, message logging is a powerful tool that makes it easier for administrators to manage networks. One of the biggest challenges, however, is how to better analyze the large number of log messages received from numerous network devices in a network.

Accordingly, there is a need for advancing and improving analysis techniques in the above-described environment, as well as advancing and improving analysis techniques associated with other similar or even unrelated environments.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 4a-4m are figures related to an example for use in describing the method of FIG. 3;

FIGS. 5a-5g are figures related to another example for use in describing the method of FIG. 3.

Figure 1:
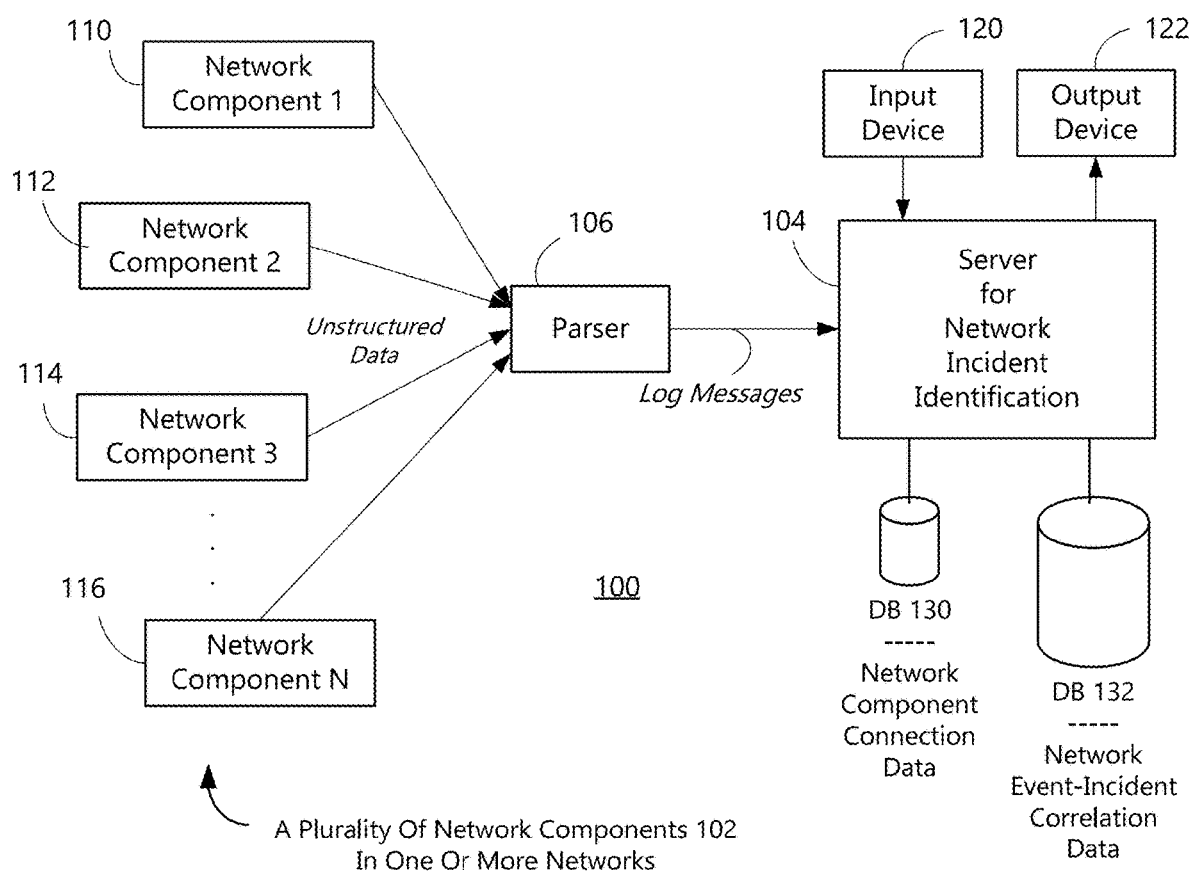
FIG. 1 is an illustrative diagram of a system for network incident identification in one or more networks.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques for use in network incident identification are described herein. In response to an occurrence of an unknown network incident, a plurality of log messages (e.g. syslog messages) are received from a plurality of network components in one or more networks. In one illustrative example, a plurality of relationships between interfaces and events are derived from the received log messages and characterized as a plurality of graphical component relationships. One or more groups of connected components are determined from the graphical component relationships and network component connection data which indicate interface relationships of the network components. Here, groups of connected components may be logically joined based on the network component connection data indicating one or more interface relationships of the network components. A network incident may then be identified based on at least one of the determined groups of connected components being associated with at least one identified set of events that has the closest or substantial match with at least one predetermined set of events associated with the network incident.

Example Embodiments

FIG. 1 is an illustrative diagram of a system 100 which may employ network incident identification in one or more networks according to the present disclosure. The one or more networks may include a plurality of network components 102. In FIG. 1, the plurality of network components 102 include network components 110, 112, 114, and 116. A network component in the one or more networks may be or include any type of network infrastructure device, such as a router, a switch, a server, etc.

A network component may be configured to perform message logging. In particular, "syslog" message logging may be employed in each network component. Syslog is a protocol for message logging to generate and store log messages locally in a network component, and then forward them for collection, filtering, organization, and analysis. Such a log message may include an event description or indication associated with an event, and at least one interface identifier associated with at least one network component interface of a network component in the one or more networks. Other examples of log messages include messages from streaming telemetry, Simple Network Management Protocol (SNMP), Command Line Interface (CLI) data collection, and network event traps.

Server 104 is configured for network incident identification based on received log messages from network components in the one or more networks. Log messages are received at a parser 106 in an unstructured or semi-structured data format. This streaming data includes one or more versions and variants of Operating Systems (OS) (e.g. IOS-XR, IOS-SE, IOS etc.). Parser 106 parses the various log messages and normalizes the data from the different types for generating log messages in a structured format. Parser 106 communicates the resulting structured log messages to server 104.

Figure 2:
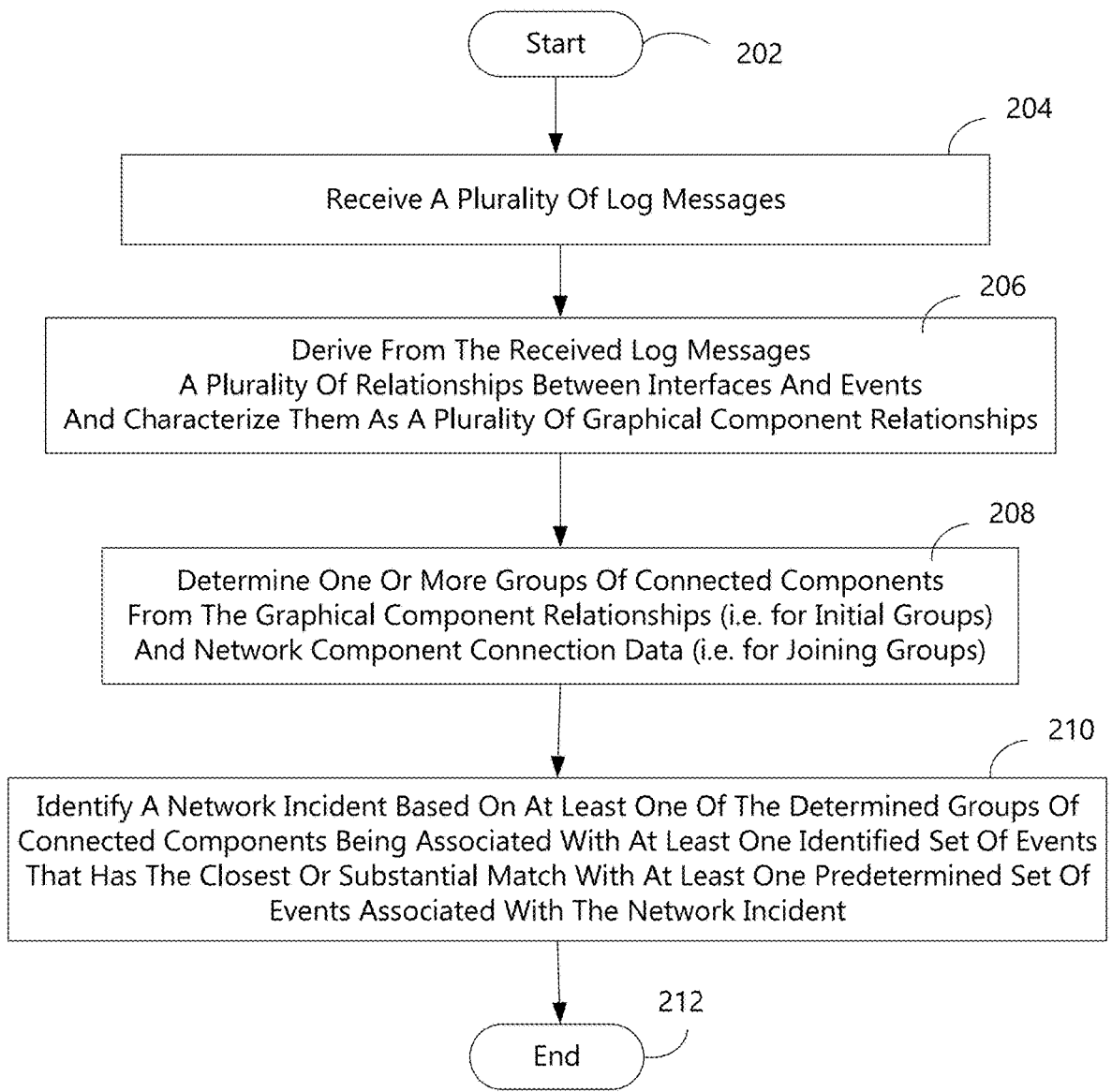
FIG. 2 is a flowchart for use in describing a general method of network incident identification according to the present disclosure.
Figure 3:
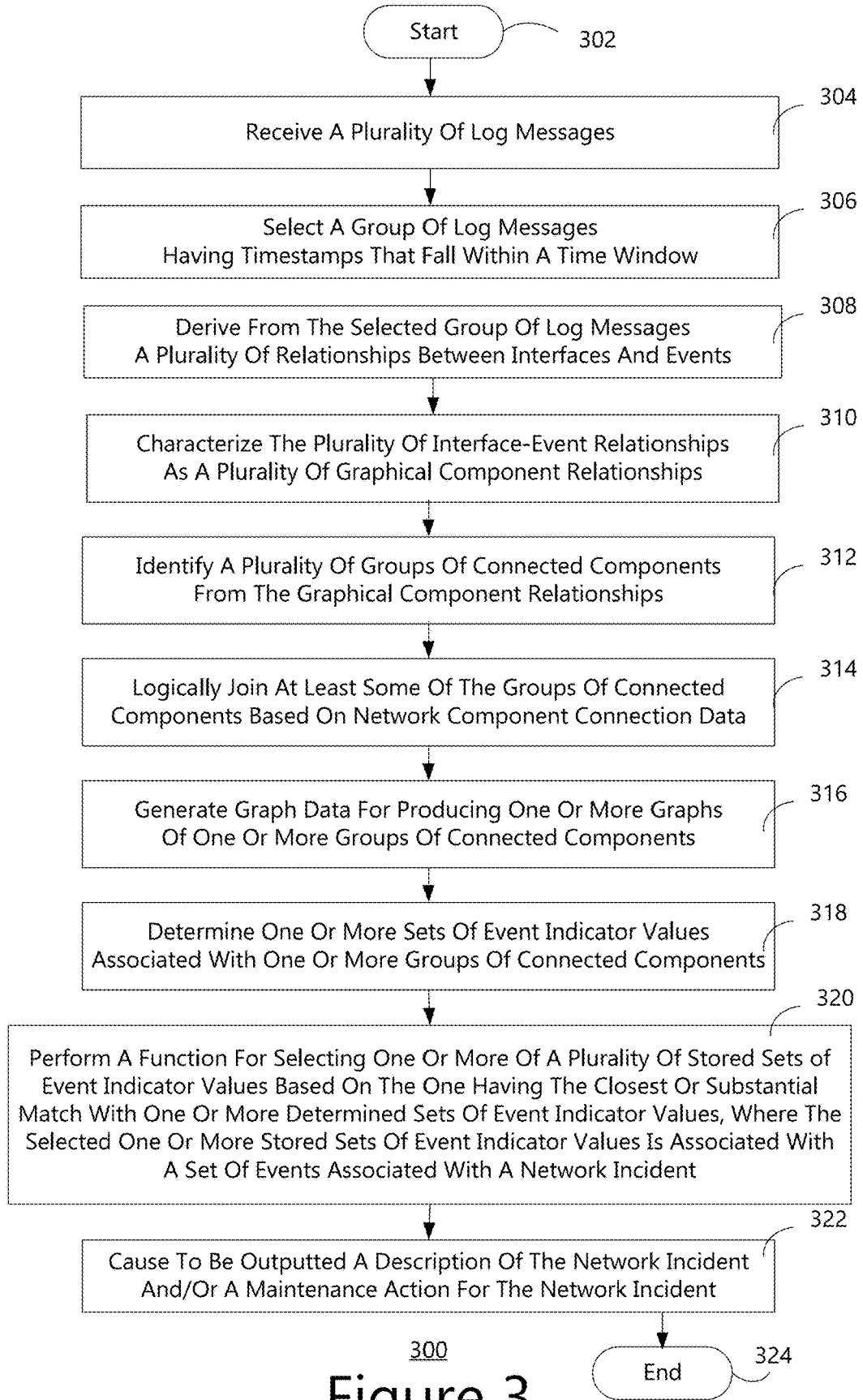
FIG. 3 is a flowchart for use in describing a more detailed method of network incident identification according to the present disclosure.

Server 104 receives the structured log messages and performs network incident identification according to the present disclosure (e.g. the methods described in relation to FIGS. 2 and 3). The network incident identification is provided as an automated or semi-automated process in system 100.

For this purpose, server 104 maintains access to a DB 130 which stores network component connection data associated with the one or more networks. The network component connection data are used to describe or characterize the interface or connection relationships of the plurality of network components 102. More particularly, the network component connection data may indicate interface relationships of network component interfaces of network components 102. The interface relationships may include physical interfaces. In addition or alternatively, the interface relationships may include logical interfaces or logical session endpoints, such as IP addresses, Layer 2 Virtual Private Network (VPN) Pseudo Wire (PW), or Virtual Private LAN Service (VPLS), Generic Routing Encapsulation (GRE) tunnels, Layer 3 VPN, Border Gateway Patrol (BGP) neighborship, Interior Gateway Protocol (IGP) neighborship, etc.

In addition, server 104 also maintains access to a DB 132 which stores network event-incident correlation data. The network event-incident correlation data may include a plurality of (e.g. unique) stored sets of event indicator values associated with connected component groups, where each set of event indicator values corresponds to a (e.g. unique) set of events associated with a network incident. Each stored set of event indicator values may be or be referred to as a stored "rule." The network event-incident correlation data may further include a description of the network incident and/or a maintenance action (or guidance) for the network incident which is stored in association with each set of event indicator values.

The network event-incident correlation data may be derived and entered via an input device 102 (e.g. keyboard, touch screen display, machine-to-machine communication, etc.) in advance of operation, based on domain knowledge of a human analyst and/or machine learning algorithm. When the network incident is identified, a description of the network incident and/or maintenance action for the network incident may be outputted from an output device 122 (e.g. a visual display or machine-to-machine communication).

Server 104 of FIG. 1 and its operation are now described in more detail in relation to FIGS. 2 and 3.

FIG. 2 is a flowchart 200 for use in describing a general method of network incident identification according to the present disclosure. The method may be embodied in a server or network device including one or more processors and a network interface coupled to the one or more processors, where the one or more processors are configured for performing the steps of the method. The method may also be embodied as a computer program product including a non-transitory computer readable medium and instructions stored in the non-transitory computer readable medium, where the instructions are executable on one or more processors of a server or network device for performing the steps of the method.

To begin in FIG. 2, an unknown network incident occurs. In response to this network incident, and beginning at a start block 202 of FIG. 2, a plurality of log messages are received from a plurality of network components in one or more networks (step 204 of FIG. 2). A network component in the one or more networks may be or include any type of network infrastructure device, such as a router, a switch, a server, etc. A log message may be a "syslog message" or other suitable type of message for event logging (e.g. a message from streaming telemetry, SNMP, CLI data collection, and network event traps). A log message may include an event description or indication associated with an event, and at least one interface identifier associated with at least one network component interface of a network component in the one or more networks. As is apparent, a log message may indicate an association or relationship between an event and at least one interface.

In the technique, a plurality of relationships between interfaces and events are derived from the received log messages ad characterized as a plurality of graphical component relationships (step 206 of FIG. 2). An interface-event relationship may be characterized as a graphical component relationship by assigning or indicating an interface identifier pair (or e.g. single interface identifier) in a log message as a graph vertex pair, and an event description in the log message as a graph edge between a graph vertex pair. The interface-event relationship may be said to be provided in an edge triplet format.

One or more groups of connected components are determined from the graphical component relationships and network component connection data (step 208 of FIG. 2). Here, initial groups of connected components may be identified from the relationships based on identifying one or more interface identifiers that are related or the same (e.g. connected). At least some of these initial groups of connected components may then be logically joined based on the network component connection data indicating one or more interface relationships of network component interfaces.

A network incident may then be identified based on the above-generated information (step 210 of FIG. 2). More particularly, a network incident may be identified based on at least one of the determined groups of connected components being associated with at least one identified set of events that has the closest or substantial match with at least one predetermined set of events associated with the network incident. In some implementations, the network incident may be identified or selected with use of function, such as a k-nearest-neighbors (kNN) function or Rete algorithm function. The identified network incident and/or a maintenance action (or guidance) for the identified network incident may be outputted (e.g. visually displayed in a visual display). The flowchart ends at an end block 212 of FIG. 2.

FIG. 3 is a flowchart for use in describing a more detailed method of network incident identification according to the present disclosure. Again, the method may be embodied in a server or network device which includes one or more processors and a network interface coupled to the one or more processors, where the one or more processors are configured for performing the steps of the method. The method may also be embodied as a computer program product which includes a non-transitory computer readable medium and instructions stored in the non-transitory computer readable medium, where the instructions are executable on one or more processors of a server or network device for performing the steps of the method.

Figures 4A, 4B:
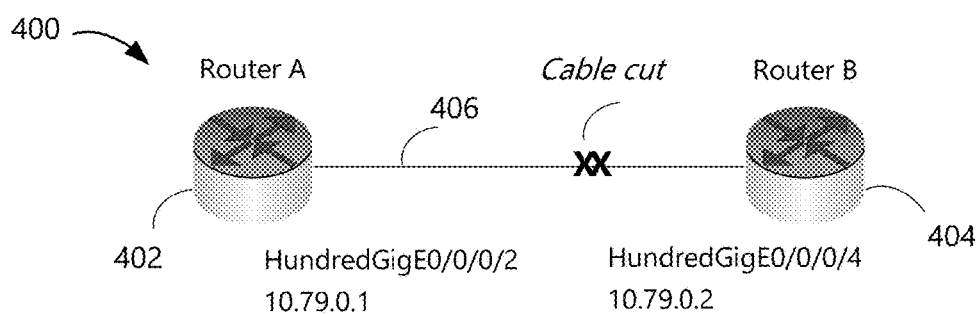

The method of FIG. 3 will be described together in relation to an example provided in relation to FIGS. 4a-4m. In FIG. 4A, what is shown is a plurality of network components 400 of a network. Here, the plurality of network components 400 includes a network component 402 which is a router ("Router A") and a network component 404 which is also a router ("Router B"). In this example, network components 402 and 404 are connected by a connection 406 which is a fiber link. Here, network component 402 has a physical link or interface indicated as HundredGigE0/0/0/2 and a logical link or interface (e.g. IP address) indicated as 10.79.0.1. On the other hand, network component 404 has a physical link or interface indicated as HundredGigE0/0/0/4 and a logical link or interface (e.g. IP address) indicated as 10.79.0.2.

In FIG. 4B, network component connection data 410 are stored and maintained in a database (e.g. DB 130 of FIG. 1 which stores and maintains network component connection data). Network component connection data 410 are used to describe or characterize the interface relationships of the plurality of network components 400. Network component connection data 410 of FIG. 4B indicate interface relationships of network component interfaces of network components 400 of FIG. 4A. Network component connection data 410 are shown in a table 412 which indicates physical interface relationships between physical interfaces, and in a table 414 which indicates interface relationships with logical interfaces or logical endpoint sessions (e.g. IP addresses).

Given the above context, an unknown network incident occurs. The unknown network incident may be, for example, a cable cut of a link between network components. In response to the network incident, and beginning at a start block 302 of FIG. 3, a plurality of log messages are received from a plurality of network components in one or more networks (step 304 of FIG. 3). A network component in the one or more networks may be or include any type of network infrastructure device, such as a router, a switch, a server, etc. In this example, the plurality of network components includes network components 402 and 404 (i.e. Routers A and B) of FIG. 4A. Again, a log message may be a "syslog message" or other suitable type of message for event logging as described earlier. A log message may include an event description or indication associated with an event, and at least one interface identifier associated with at least one network component interface of a network component in the one or more networks.

A log message may also include a timestamp indicating a time of generation or transmission of the log message. In some implementations, a group (or subset) of received log messages having timestamps that fall within a (e.g. moving) time window are selected for further analysis (step 306 of FIG. 3). Those log messages that are received before and after the time window are ignored in the further analysis. Beyond the grouping of received log messages within a given time window, the timestamps or ordering of the receipt of log messages (i.e. the events) may be ignored.

In FIG. 4C, an example of log messages 420 from network component 402 ("Router A") and network component 404 ("Router B") are shown.

As described earlier, a log message may indicate an association or relationship between an event and at least one interface. In the technique, a plurality of relationships between interfaces and events are derived from the selected group of received log messages (step 308 of FIG. 3). These plurality of interface-event relationships are characterized as a plurality of graphical component relationships (step 310 of FIG. 3). An interface-event relationship may be characterized as a graphical component relationship by assigning or indicating an interface identifier pair (or e.g. single interface identifier) in a log message as a graph "vertex" pair, and an event description in the log message as a graph "edge" between a graph vertex pair. The interface-event relationship may be said to be provided in an edge triplet format.

In FIG. 4D, an example of interface-event relationships 430 which are characterized as graphical component relationships are illustrated in a table. The interface-event relationships 430 which are characterized as graphical component relationships are derived from log messages 420 of FIG. 4C. In the table of FIG. 4D, each row of the table represents one of the log messages including an interface-event relationship. The $1^{st}$ and $3^{rd}$ columns of the table indicate the interface identifier pair from the log message as a graph "vertex" pair, and the $2^{nd}$ column of the table indicates the event description of the log message as a graph "edge" between the graph vertex pair.

One or more groups of connected components are determined from the previously-described relationships. In some implementations, this determination is performed as described in steps 312 and 314 of FIG. 3. Here, initial groups of connected components may be identified from the relationships based on identifying one or more interface identifiers that are related or the same (e.g. connected) (step 312 of FIG. 3). At least some of these initial groups of connected components may then be logically joined based on the network component connection data indicating one or more interface relationships of network component interfaces (step 314 of FIG. 3).

In the example of FIGS. 4a-4m, the initial groups of connected components identified in view of the interface-event relationships 430 of FIG. 4D are as follows: connected component 1: {A: HundredGigE0/0/0/2, B: 10.79.0.2}; connected component 2: {B: HundredGigE0/0/0/4, A: 10.79.0.1}; and connected component 3: {A: HundredGigE0/0/0/7}. Two of these initial groups of connected components may be logically joined based on an interface relationship indicated in graphical component connection data 410 of FIG. 4B (namely, an interface relationship of physical interfaces, HundredGig0/0/0/2 and HundredGig0/0/0/4). The resultant groups of connected components after the logical joining of groups are as follows: connected component 1: {A: HundredGigE0/0/0/2, B: 10.79.0.2, B: HundredGigE0/0/0/4, A: 10.79.0.1}; and connected component 2: {A: HundredGigE0/0/0/7}.

Graph data may be generated for producing one or more graphs of one or more resultant groups of connected components (step 316 of FIG. 3). The one or more graphs may be visually displayed at an output device (e.g. output device 122 of FIG. 1). This step may be performed for any desired or necessary further detailed analysis, and/or for use in furthering the domain knowledge by a human analyst or machine learning algorithm for building the DB of network event-incident correlation data.

An example of graphs 440 and 442 of the two resultant groups of connected components is provided in FIG. 4E. Graph 440 for connected component group 1 includes interface identifiers indicated as graph vertices 444, 446, 448, and 450, and event descriptions (or interface relationships) indicated as graph edges 452, 454, 456, 458, and 460 between graph vertices. Graph 442 for connected component group 2 includes an interface identifier indicated as a graph vertex 462, and an event description indicated as a graph edge 464 associated with the graph vertex.

A network incident may then be identified based on the above-generated data. More particularly, a network incident may be identified based on at least one of the determined groups of connected components being associated with at least one identified set of events that has the closest or substantial match with at least one predetermined set of events associated with the network incident. In some implementations, the identification of the network incident is performed as described in relation to steps 318 and 320 of FIG. 3.

In relation to steps 318 and 320, note again that network event-incident correlation data are stored and maintained in a database (e.g. DB 132 of FIG. 1 which stores and maintains network event-incident correlation data). The network event-incident correlation data may include a plurality of (e.g. unique) stored sets of event indicator values, where each stored set of event indicator values corresponds to a (e.g. unique) set of events associated with a network incident. Each stored set of event indicator values may be or be referred to as a stored "rule." The network event-incident correlation data may further include a description of the network incident and/or a maintenance action for the network incident which is stored in association with each stored set of event indicator values. The network event-incident correlation data may be derived and entered into the system (e.g. via input device 120 of FIG. 1) based on domain knowledge from a human analyst and/or a machine learning algorithm.

An example of a plurality of stored sets of event indicator values 470, where each stored set is associated with a network incident, is shown in a table of FIG. 4F. Here, each row of the table indicates a stored set of event indicator values associated with a network incident, and each column of the table indicates whether or not an event associated with a given connected component should exist for the network incident ("0"=event should not exist; "1"=event should exist).

A plurality of sets of event indicator values associated with the resultant groups of connected components are determined (step 318 of FIG. 3). Each determined set of event indicator values may correspond to a set of events derived from the event descriptions of a group of connected components. Each determined set of event indicator values may be referred to as a "key."

An example of a plurality of determined sets of event indicator values 480 for connected component groups 1 and 2 is shown in a table of FIG. 4G. Here, each row of the table indicates a determined set of event indicator values for a given connected component group, and each column of the table indicates whether or not an event occurred in relation to a given connected component ("0"=event did not occur; "1"=event occurred).

A function is performed for selecting one of the plurality of stored sets of event indicator values (i.e. from the network event-incident correlation data) based on the one having the closest or substantial match with one of the determined sets of event indicator values (step 320 FIG. 3). In some implementations, the function may be or include a k-nearest-neighbors (kNN) function or a Rete algorithm function.

In the present example, a kNN function is performed. In general, a kNN function operates to classify unknown patterns against a set of previously-known patterns based on distance. On applying the kNN function to the pattern in FIG. 4G against the known pattern in FIG. 4F, it is identified that connected component 1 matches to rule 1 and rule 2. For connected component 1, however, rule 1 is a closer match. For connected component 2 in FIG. 4G, rule 2 in FIG. 4F is a closer match.

The description of the identified network incident and/or a maintenance action for the identified network incident may be outputted (e.g. visually displayed in a visual display or published for machine-to-machine communication) (step 322 of FIG. 3). In this example, the identified network incident corresponds to a cable cut of the link between network components. A description of the identified network incident and/or maintenance action for the identified network incident may be outputted as follows: "OSPF flapped because of the physical link going down. Field team to inspect fiber cuts or other reason for link down." The flowchart ends at an end block 324 of FIG. 3.

In some implementations, the kNN function is enhanced or optimized with additional use of a voting function. As mentioned above, the kNN function generally operates to classify unknown patterns against a set of previously-known patterns based on distance. Although the kNN function may be suitable in many or most scenarios, there may be scenarios where distance alone cannot confirm a match. Using an additional voting function, each rule may respond with a vote to the kNN function. Thus, the kNN function may be combined with a voting function for converging on a final prediction or set of predictions. Illustrating the use of such a voting function in relation to the example of FIGS. 4a-4m, it is noted in FIG. 4F that the action associated with rule 1 indicates there is an OSPF flap due to link flap. Rule 1 indicates that OSPF-ADJDOWN and LINK-DOWN events should be present at a minimum for one of the two routers. Thus, here, rule 1 is configured to operate to vote positive for a match if the unknown pattern has a minimum of one occurrence of OSPF-ADJDOWN and LINK-DOWN event.

To illustrate a variation in the present example, in FIG. 4H, an alternative determined set of event indicator values 490 for a connected component group is shown. Here, the unknown network incident corresponds to Router B becoming "dead" silently. Applying the kNN function on FIG. 4H against the known pattern in FIG. 4F, it may be identified that rule 1 is a closer match than rule 2.

In some implementations, the event data used with the function for matching may be simplified based on correlating events across a physical or logical link. Logical link refers to higher layer sessions where nodes act as peers at the session level, but are multiple hops away with respect to physical topology. When correlating events across a physical or logical link, symmetry may be assumed in the list of log messages generated on the two endpoint routers of the link (i.e. the same or similar set of messages are generated on two peering routers). To illustrate the simplification of data in the present example, FIG. 4F may be replaced with FIG. 4*i* showing alternative network event-incident correlation data ("rules") as an alternative plurality of sets of event indicator values 475. Further, FIG. 4G may be replaced with FIG. 4J showing an alternative plurality of determined sets of event indicators values 485. Viewing FIGS. 4*i* and 4*j*, it can be seen that event data for both Router 1 (R1) and Router 2 (R2) need not be utilized (compare to FIGS. 4*f* and 4*g*). Advantageously, the kNN function may be used for matching FIG. 4*i* with FIG. 4J.

In some implementations, further refinement to the kNN function and matching processes may be realized. Note that, in a network, it is not uncommon that a single router is responsible as the originator of multiple network failures. In the example of FIG. 4A-4*h*, it is apparent that router 402 ("Router A") had two link failures. To isolate Router A as a source of multiple link failures in the network, a network expert may define a higher-level "meta-rule" as provided in a table 496 of FIG. 4K. In FIG. 4K, column 1 indicates an identifier of the meta-rule, column 2 indicates an identifier of the rule from FIG. 4F, and column 3 indicates the number of distinct component groups on the router matching the rule number from FIG. 4F. FIG. 4L shows a table 497 which is derived from FIG. 4G, where column 1 indicates the router name, column 2 indicates the rule number from FIG. 4F, and column 3 indicates the count of number of distinct component groups matching the rule number. The kNN function may be applied between FIG. 4K and FIG. 4L to generate the output in FIG. 4M. In a table 498 of FIG. 4M, column 1 indicates the router name, column 2 indicates the meta-rule number from FIG. 4K, and column 3 indicates the matching incident. The output of FIG. 4M may be sent to a visualization tool or other machine-to-machine algorithm. Alternatively, the output of FIG. 4M may be used for applying the kNN for next higher layer (i.e. a hierarchy of kNN functions.

As is apparent, the above technique for network incident identification in FIG. 3 utilizes event indicator values corresponding to events without regard to their associated interface identifiers (e.g. see steps 318 and 320 of FIG. 3). Thus, events may be analyzed in the abstract or in relation to abstract network components, thereby enabling the same data/technique to be used across the network, across all or most interfaces in the network. Put another way, defining the rules based on edges without specific vertices assists in reuse of the same rules across the network.

Figure 5E:
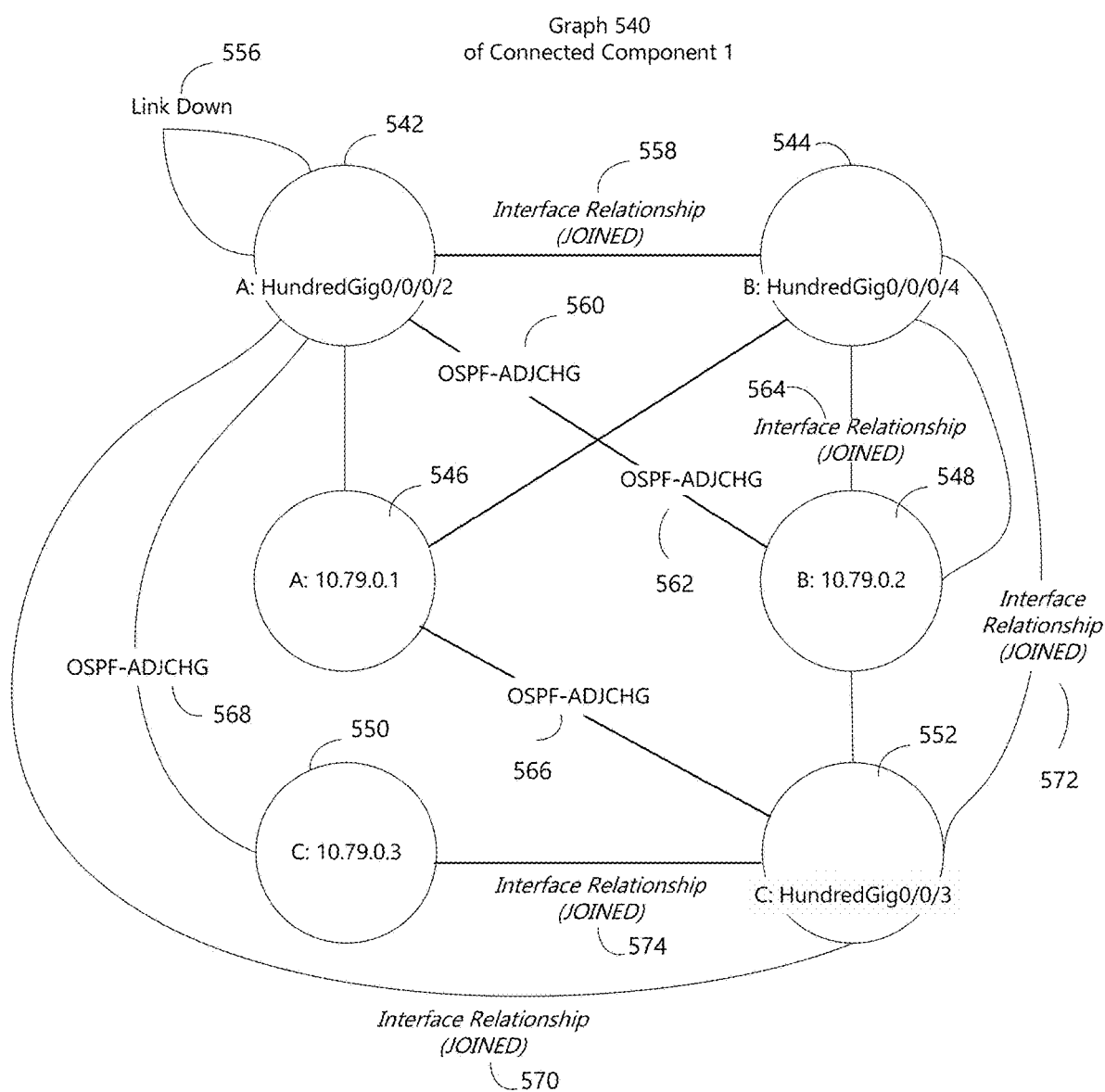

Now, the method of FIG. 3 will be discussed again together with another example provided in relation to FIGS. 5a-5g. In FIG. 5A, what is shown is a plurality of network components 500 of a network. Here, the plurality of network components 500 includes a network component 502 which is a router ("Router A"), a network component 504 which is a router ("Router B"), and a network component 506 which is also a router ("Router C"). In this example, each one network components 502, 504, and 506 are configured to run an Open Shortest Path First (OSPF) protocol on a local area network (LAN). Network components 504 and 506 are connected to network component by a connection 508 which is a fiber link.

In FIG. 5A, network component 502 has a physical link or interface indicated as HundredGigE0/0/0/2 and a logical link or interface (e.g. IP address) indicated as 10.79.0.1. Network component 504 has a physical link or interface indicated as HundredGigE0/0/0/4 and a logical link or interface (e.g. IP address) indicated as 10.79.0.2. Network component 506 has a physical link or interface indicated as HundredGigE0/0/0/3 and a logical link or interface (e.g. IP address) indicated as 10.79.0.3.

In FIG. 5B, network component connection data 510 are stored and maintained in a database (e.g. DB 130 of FIG. 1 which stores and maintains network component connection data). Network component connection data 510 are used to describe or characterize the interface relationships of the plurality of network components 500. Network component connection data 510 of FIG. 4B indicate interface relationships of network component interfaces of network components 500 of FIG. 5A. Network component connection data 510 are shown in a table 512 which indicates physical interface relationships between physical interfaces, and in a table 514 which indicates interface relationships with logical interfaces or logical session endpoints (e.g. IP addresses).

Given the above context, an unknown network incident occurs. The unknown network incident may be, for example, a "link down" incident of connection 508 between network component 502 and network components 504 and 506.

In response to the network incident, and beginning at a start block 302 of FIG. 3, a plurality of log messages are received from a plurality of network components in one or more networks (step 304 of FIG. 3). A network component in the one or more networks may generally be or include any type of network infrastructure device, such as a router, a switch, a server, etc. In this example, the plurality of network components includes network components 502, 504, and 506 (i.e. Routers A, B, and C) of FIG. 5A. Again, a log message may be a "syslog message" or other suitable type of message for event logging. A log message may include an event description or indication associated with an event, and at least one interface identifier associated with at least one network component interface of a network component in the one or more networks.

A log message may also include a timestamp indicating a time of generation or transmission of the log message. In some implementations, a group (or subset) of received log messages having timestamps that fall within a (e.g. moving) time window are selected for further analysis (step 306 of FIG. 3). Those log messages that are received before and after the time window are ignored in the further analysis. Beyond the grouping of received log messages within a given time window, the timestamps or ordering of the receipt of log messages (i.e. the events) may be ignored.

In FIG. 5C, an example of log messages 520 from network component 502 ("Router A"), network component 504 ("Router B"), and network component 506 ("Router C") are shown.

As described earlier, a log message may indicate a relationship between an event and at least one interface. A plurality of relationships between interfaces and events are derived from the selected group of received log messages (step 308 of FIG. 3), and these relationships are characterized as a plurality of graphical component relationships (step 310 of FIG. 3). An interface-event relationship may be characterized as a graphical component relationship by assigning or indicating an interface identifier pair (or e.g. single interface identifier) in a log message as a graph "vertex" pair, and an event description in the log message as a graph "edge" between a graph vertex pair. The interface-event relationship may be said to be provided in an edge triplet format.

In FIG. 5D, an example of interface-event relationships 530 which are characterized as graphical component relationships are illustrated in a table. The interface-event relationships 530 which are characterized as graphical component relationships are derived from log messages 520 of FIG. 5C. In the table of FIG. 5D, each row of the table represents one of the log messages including an interface-event relationship. The $1^{st}$ and $3^{rd}$ columns of the table indicate the interface identifier pair from the log message as a graph "vertex" pair, and the $2^{nd}$ column of the table indicates the event description of the log message as a graph "edge" between the graph vertex pair.

One or more groups of connected components are determined from the previously-described relationships. In some implementations, this determination is performed as described in steps 312 and 314 of FIG. 3. Here, initial groups of connected components may be identified from the relationships based on identifying one or more interface identifiers that are related or the same (e.g. connected) (step 312 of FIG. 3). At least some of these initial groups of connected components may then be logically joined based on the network component connection data indicating one or more interface relationships of network component interfaces (step 314 of FIG. 3).

In the example of FIGS. 5a-5g, the initial groups of connected components identified in view of the interface-event relationships 530 of FIG. 5D are as follows: connected component 1: {A: HundredGigE0/0/0/2, B: 10.79.02, C: 10.79.0.3} connected component 2: {B: HundredGigE0/0/0/4, A: 10.79.0.1} and connected component 3: {C: HundredGigE0/0/0/4, A: 10.79.0.1}. Three of these initial groups of connected components may be logically joined based on an interface relationship indicated in graphical component connection data 510 of FIG. 5A; namely, an interface relationship of interfaces A: HundredGigE0/0/0/2, B: HundredGigE0/0/0/4, C: HundredGigE0/0/0/3. The resultant group of connected components after the logical joining of groups are as follows: connected component 1 {A: HundredGigE0/0/0/2, B: 10.79.0.2, C: 10.79.0.3, B: HundredGigE0/0/0/4, A: 10.79.0.1, C: HundredGigE0/0/0/3}.

Graph data may be generated for producing one or more graphs of one or more resultant groups of connected components (step 316 of FIG. 3). The one or more graphs may be visually displayed at an output device (e.g. output device 122 of FIG. 1). This step may be performed for any desired or necessary further detailed analysis, and/or for use in furthering the domain knowledge by a human analyst or machine learning algorithm for building the DB of network event-incident correlation data.

An example of a graph 540 of the resultant group of connected components is provided in FIG. 5E. Graph 540 for connected component group 1 includes interface identifiers indicated as graph vertices 542, 544, 546, 548, 550, and 552, and event descriptions (or interface relationships) indicated as graph edges 556, 558, 560, 562, 564, 566, 568, 570, 572, and 574 between graph vertices.

A network incident may then be identified based on the above-generated data. More particularly, a network incident may be identified based on at least one of the determined groups of connected components being associated with at least one identified set of events that has the closest or substantial match with at least one predetermined set of events associated with the network incident. In some implementations, the identification of the network incident is performed as described in relation to steps 318 and 320 of FIG. 3.

In relation to steps 318 and 320, note again that network event-incident correlation data are stored and maintained in a database (e.g. DB 132 of FIG. 1 which stores and maintains network event-incident correlation data). The network event-incident correlation data may include a plurality of (e.g. unique) stored sets of event indicator values, where each stored set of event indicator values corresponds to a (e.g. unique) set of events associated with a network incident. Each stored set of event indicator values may be or be referred to as a stored "rule." The network event-incident correlation data may further include a description of the network incident and/or a maintenance action for the network incident which is stored in association with each stored set of event indicator values. The network event-incident correlation data may be derived and entered into the system (e.g. via input device 120 of FIG. 1) based on domain knowledge from a human analyst and/or a machine learning algorithm.

An example of a stored set of event indicator values 580 associated with a network incident is shown in a table of FIG. 5F. Here, the row in the table indicates a stored set of event indicator values associated with a network incident, and each column of the table indicates whether or not an event associated with a given connected component should exist for the network incident ("0"=event should not exist; "1"=event should exist).

One or more sets of event indicator values associated with the resultant one or more groups of connected components are determined (step 318 of FIG. 3). A determined set of event indicator values may correspond to a set of events derived from the event descriptions of a group of connected components. A determined set of event indicator values may be referred to as a "key."

An example of a determined set of event indicator values 590 for connected component group 1 is shown in a table of FIG. 5G. Here, a row of the table indicates a determined set of event indicator values for a connected component group 1, and each column of the table indicates whether or not an event occurred in relation to a connected component ("0"=event did not occur; "1"=event occurred).

A function is performed for selecting one of the plurality of stored sets of event indicator values (i.e. from the network event-incident correlation data) based on the one having the closest or substantial match with a determined set of event indicator values (step 320 FIG. 3). In some implementations, the function may be or include a k-nearest-neighbors (kNN) function. Any other suitable function, such as a Rete algorithm function, may be utilized as an alternative.

Again, in general, a kNN function operates to classify unknown patterns against a set of previously-known patterns based on distance. On applying the kNN function to the pattern in FIG. 5G against the known pattern in FIG. 5F, it is identified that connected component 1 matches to rule 2.

In this example, the identified network incident corresponds to a "network down" of the link between network components. A description of the identified network incident and/or maintenance action for the identified network incident may be as follows: "OSPF ADJDOWN due to link failure on Router 1; Field to inspect link failure."

The description of the identified network incident and/or a maintenance action for the identified network incident may be outputted (e.g. visually displayed in a visual display)) (step 322 of FIG. 3). The flowchart ends at an end block 324 of FIG. 3.

Notably, as described previously, the above technique for network incident identification in FIG. 3 utilizes event indicator values corresponding to events without regard to their associated interface identifiers (e.g. see steps 318 and 320 of FIG. 3). Thus, events may be analyzed in the abstract or in relation to abstract network components, thereby enabling the same data/technique to be used across the network, across all or most interfaces in the network. Put another way, defining the rules based on edges without specific vertices assists in reuse of the same rules across the network.

Figure 6:
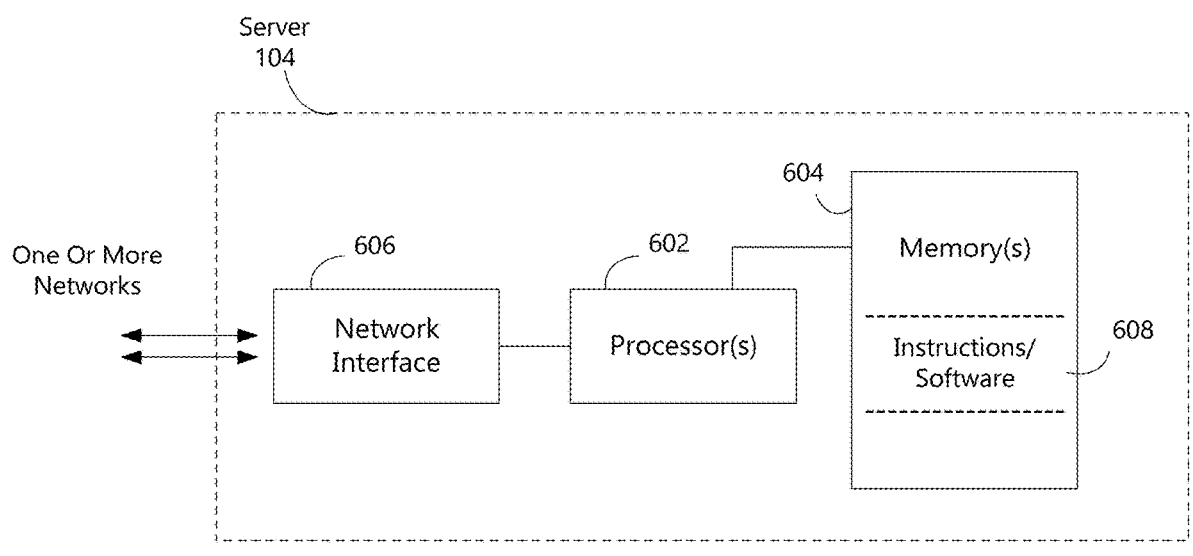
FIG. 6 shows a block diagram of an example of pertinent components of a server, which may be utilized for the techniques of the present disclosure.

FIG. 6 shows a block diagram 600 of an example of pertinent components of a server (e.g. server 104 of FIG. 1) which may be utilized for the techniques of the present disclosure. Server 104 of FIG. 6 has components which may include one or more processors 602 which are coupled to memory 604 and to a network interface 606. Memory 604 may include databases (e.g. DB 130 and 132 of FIG. 1). Network interface 606 is configured to connect to one or more networks for communications. The one or more processors 602 of the server are configured to operate according to instructions 608 stored in memory 604, in order to perform basic operations as well as to perform techniques of the present disclosure.

Thus, techniques for use in network incident identification have been described. In response to an occurrence of an unknown network incident, a plurality of log messages (e.g. syslog messages) are received from a plurality of network components in one or more networks. In one illustrative example, a plurality of relationships between interfaces and events are derived from the received log messages and characterized as a plurality of graphical component relationships. One or more groups of connected components are determined from the graphical component relationships and network component connection data. Here, groups of connected components may be logically joined based on the network component connection data indicating one or more interface relationships of the network components. A network incident may then be identified based on at least one of the determined groups of connected components being associated with at least one identified set of events that has the closest or substantial match with at least one predetermined set of events associated with the network incident.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

In the above embodiments and examples, a plurality of relationships between interfaces and events were derived from received log messages and characterized as a plurality of graphical component relationships. In some alternative implementations, the relationships are between one or two different elements, such as between routers and events, systems and events, components and events, components and measurements, etc.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
    receiving a plurality of log messages from a plurality of network components of one or more networks in response to a network incident;
    deriving, from the plurality of log messages received in response to the network incident, a plurality of relationships between interfaces and events contained in the plurality of log messages, wherein each of the plurality of log messages comprises a description of an event and at least one interface identifier;
    characterizing the plurality of relationships between the interfaces and the events as a plurality of graphical component relationships, wherein characterizing the plurality of relationships as the plurality of graphical component relationships comprises:
        assigning the at least one identifier from each of the plurality of log messages as a graph vertex, and
        assigning the event description from each of the plurality of log messages as a graph edge connected to the graph vertex;
    determining one or more groups of connected components from the graphical component relationships and network component connection data, wherein the network component data indicates interface relationships of the plurality of network components; and
    identifying the network incident based on the determined one or more groups of connected components, the network incident being associated with at least one identified set of events that has the closest or substantial match with at least one predetermined set of events associated with the network incident.

2. The method of claim 1, further comprising causing to be outputted a description of the network incident and a maintenance action for the network incident.

3. The method of claim 1, wherein determining the one or more groups of connected components comprises:
    joining at least some of the one or more groups of connected components identified from the plurality of graphical component relationships based on the network component connection data indicating the interface relationships of the plurality of network components.

4. The method of claim 1, wherein a relationship between an interface and an event which is characterized as a graphical component relationship comprises an interface identifier pair as a graph vertex pair and the event description as the graph edge between the graph vertex pair.

5. The method of claim 1, wherein identifying the network incident further comprises:

determining one or more sets of event indicator values corresponding to the one or more groups of connected components; and performing a function for selecting one or more of a plurality of stored sets of event indicator values based on the one having the closest or substantial match with the determined one or more sets of event indicator values, the one or more stored sets of event indicator values indicating one or more sets of events associated with the network incident.

6. The method of claim 5, wherein the function comprises at least one of the following: a k-nearest neighbors (kNN) function and Rete algorithm function.

7. The method of claim 5, wherein the function comprises a k-nearest neighbor (kNN) function and a voting function for responding with a vote to the kNN function.

8. The method of claim 1, further comprising:
selecting a meta-rule corresponding to the network incident based on one or more stored sets of event indicator values and a number of the one or more groups of connected components matching the one or more stored sets of event indicator values.

9. The method of claim 1, further comprises:
generating graph data for producing one or more graphs of the determined one or more groups of connected components.

10. The method of claim 1, wherein a log message of the plurality of log messages includes a timestamp, the method further comprising:
selecting log messages having timestamps that fall within a time window based on the timestamp.

11. The method of claim 1, further comprising
wherein the plurality of log messages comprise one or more of syslog messages, telemetry messages, command line interface (CLI) messages, and simple network management protocol (SNMP) messages;
wherein the plurality of network components comprise routers and switches; and
wherein the interfaces comprise physical interfaces, logical interfaces, and logical session endpoints.

12. A server comprising:
a memory device; and
one or more processors connected to the memory device, wherein the one or more processors being configured to:
receive a plurality of log messages from a plurality of network components of one or more networks in response to a network incident;
derive, from the plurality of log messages received in response to the network incident, a plurality of relationships between interfaces and events contained in the plurality of log messages, wherein each of the plurality of log messages comprises a description of an event and at least one interface identifier;
characterize the plurality of relationships between the interfaces and the events as a plurality of graphical component relationships, wherein the one or more processors being operative to characterize the plurality of relationships as the plurality of graphical component relationships comprises the one or more processors being operative to:
assign the at least one identifier from each of the plurality of log messages as a graph vertex, and
assign the event description from each of the plurality of log messages as a graph edge connected to the graph vertex;

determine one or more groups of connected components from the plurality of graphical component relationships and network component connection data which indicate interface relationships of the plurality of network components; and
identify the network incident based on at least one of the determined one or more groups of connected components, the network incident being associated with at least one identified set of events that has the closest or substantial match with at least one predetermined set of events associated with the network incident.

13. The server of claim 12, wherein the one or more processors are further configured for:
causing to be outputted a description of the network incident and a maintenance action for the network incident.

14. The server of claim 12, wherein the one or more processors are further configured for determining the one or more groups of connected components by:
joining at least some of the one or more groups of connected components identified from the plurality of graphical component relationships based on the network component connection data indicating one or more interface relationships of the network components.

15. The server of claim 12, wherein a relationship between an interface and an event which is characterized as a graphical component relationship comprises an interface identifier pair as a graph vertex pair and an event description as a graph edge between a graph vertex pair.

16. The server of claim 12, wherein one or more processors are further configured for identifying the network incident by:
determining one or more sets of event indicator values corresponding to a determined group of connected components; and
performing a function for selecting one of a plurality of stored sets of event indicator values based on the one having the closest or substantial match with a determined sets of event indicator values, the selected stored set of indicator values indicating a set of events associated with the network incident.

17. The server of claim 16, wherein the function comprises at least one of the following: a k-nearest neighbors (kNN) function and Rete algorithm function.

18. A computer program product that stores a set of instructions which when executed perform a method comprising:
receiving a plurality of log messages from a plurality of network components of one or more networks in response to a network incident;
deriving, from the plurality of log messages received in response to the network incident, a plurality of relationships between interfaces and events contained in the plurality of log messages, wherein each of the plurality of log messages comprises a description of an event and at least one interface identifier;
characterizing the plurality of relationships between the interfaces and the events as a plurality of graphical component relationships, wherein characterizing the plurality of relationships as the plurality of graphical component relationships comprises:
assigning the at least one identifier from each of the plurality of log messages as a graph vertex, and assigning the event description from each of the plurality of log messages as a graph edge connected to the graph vertex;

determining one or more groups of connected components from the plurality of graphical component relationships and network component connection data, wherein the network component connection data indicates interface relationships of the plurality of network components in the one or more networks; and identifying the network incident based on at least one of the determined one or more groups of connected components, the network incident being associated with at least one identified set of events that has the closest or substantial match with at least one predetermined set of events associated with the network incident.

19. The computer program product of claim 18, further comprising:

wherein the plurality of network components comprises routers and switches;

wherein the network component connection data indicates the interface relationships of network component interfaces of the network components of the one or more networks;

wherein the network component interfaces comprise physical interfaces, logical interfaces, and logical session endpoints;

wherein the plurality of log messages comprises one or more of syslog messages, telemetry messages, command line interface (CLI) messages, and simple network management protocol (SNMP) messages;

wherein a relationship between an interface and an event which is characterized as a graphical component relationship comprises an interface identifier pair as a graph vertex pair and an event description as a graph edge between a graph vertex pair;

wherein determining the one or more groups of connected components further comprises joining at least some of the one or more groups of connected components identified from the network component relationships based on the network component connection data indicating one or more interface relationships of network components; and causing to be outputted a description of the network incident and a maintenance action for the network incident.

* * * * *